United States Patent [19]

Kataoka et al.

[11] Patent Number: 4,820,787

[45] Date of Patent: Apr. 11, 1989

[54] SHAPED ARTICLE OF AN ORIENTED TETRAFLUOROETHYLENE POLYMER

[75] Inventors: Hiroshi Kataoka; Kinya Matsuzawa, both of Tokyo; Hiroji Oda, Yokohama, all of Japan

[73] Assignee: Asahi Kasei Kogyo Kabushiki Kaisha, Osaka, Japan

[21] Appl. No.: 27,540

[22] Filed: Mar. 18, 1987

[30] Foreign Application Priority Data

Mar. 18, 1986 [JP] Japan .................................. 61-58271
Aug. 6, 1986 [JP] Japan ................................ 61-183293
Nov. 4, 1986 [JP] Japan ................................ 61-260574

[51] Int. Cl.$^4$ .......................... C08F 14/18; B27J 5/00; B29D 7/22
[52] U.S. Cl. .................................... 526/255; 264/127; 264/290.2
[58] Field of Search ............................ 264/290.2, 127; 526/255

[56] References Cited

U.S. PATENT DOCUMENTS

| | | | |
|---|---|---|---|
| 4,388,259 | 6/1983 | Jewell et al. ......................... | 264/153 |
| 4,519,969 | 5/1985 | Murakami ........................ | 264/290.2 |
| 4,597,920 | 7/1986 | Golike .............................. | 264/290.2 |
| 4,610,833 | 9/1986 | Kanesaki et al. .................. | 264/290.2 |
| 4,617,164 | 10/1986 | Kanesaki et al. .................. | 264/290.2 |
| 4,620,955 | 11/1986 | Kono et al. ....................... | 264/290.2 |
| 4,692,295 | 9/1987 | Vinatier ............................ | 264/290.2 |
| 4,698,195 | 10/1987 | Okumura et al. ................. | 264/290.2 |
| 4,707,314 | 11/1987 | Kawahigashi .................... | 264/290.2 |

FOREIGN PATENT DOCUMENTS

405732 3/1974 U.S.S.R. .

OTHER PUBLICATIONS

"Modern Plastics Encyclopedia", 1986–1987, p. 548.

*Primary Examiner*—Joseph L. Schofer
*Assistant Examiner*—N. Sarofim
*Attorney, Agent, or Firm*—Birch, Stewart, Kolasch & Birch

[57] ABSTRACT

A shaped article composed of an at least biaxially orientated tetrafluoroethylene polymer of ultrahigh molecular weight, which has a draw ratio of at least 3.0, a specific gravity of at least 1.8 and an orientation release stress at 200° C. of at least 5 Kg/cm$^2$. The shaped article has excellent creep resistant and gas barrier properties, and can advantageously be utilized as a sealant, a lining material, a bearing pad, a sliding pad or the like. The shaped article may be produced by compressing a preformed sheet of a tetrafluoroethylene polymer at a temperature of from 170° to 400° C., under such conditions that plug flow of the polymer is produced, followed by cooling in the compressed state.

16 Claims, 7 Drawing Sheets

SHAPED ARTICLE OF AN ORIENTED TETRAFLUOROETHYLENE POLYMER

BACKGROUND OF THE INVENTION

1. Field of the Invention

This invention relates to a shaped article of an oriented tetrafluoroethylene polymer. More particularly, the present invention is concerned with a shaped article comprising an at least biaxially oriented tetrafluoroethylene polymer of ultrahigh molecular weight (hereinafter frequently referred to as ultrahigh molecular tetrafluoroethylene polymer) and having specific values with respect to a draw ratio, a specific gravity and an orientation release stress. The shaped article has excellent creep resistant and gas barrier properties, and accordingly can be advantageously used as a sealant, a lining material, a bearing pad or a sliding pad.

2. Discussion of Related Art

Polytetrafluoroethylene is now an important engineering material because it has various excellent properties. In many industries, polytetrafluoroethylene is now widely used as a sealant material, such as a gasket, a packing, a lining material or the like, as the polymer is excellent in its resistance to chemicals, heat, low temperatures, and has low frictional properties, non-staining properties, tack-free properties, electrical insulating properties and the like.

The melt viscosity of polytetrafluoroethylene is extremely high as compared with those of ordinary thermoplastic resins such as polystyrene, polyethylene, polyamide, acrylic resin and the like. Polytetrafluoroethylene has a melt viscosity as high as about $10^{11}$ poise even at a temperature of about 380° C. higher than its melting temperature (327° C.), whereas the melt viscosities of the ordinary thermoplastic resins are only about $10^3$ to $10^4$ poise at their melting temperatures. Due to such an extremely high melt viscosity, polytetrafluoroethylene cannot be molded by the customary molding techniques such as melt extrusion, injection molding and the like which are generally employed for the molding of these ordinary thermoplastic resins. The methods which are useful for molding polytetrafluoroethylene are limited to special methods, for example, those called compression molding, ram extrusion molding and paste extrusion molding, in which a polytetrafluoroethylene powder is compressed at an appropriate pressure to obtain a molded article and the molded article is sintered at a temperature which is higher than the melting temperature thereof, followed by cooling. For these methods, reference may be made, for example, to pages 53 to 54 of Satokawa et al "Fusso Jushi (Fluoro Resins)" published by the Nikkan Kogyo Shimbun Ltd., Tokyo, Japan, in April, 1976.

Further, it is noted that the temperature up to which polytetrafluoroethylene can be used under no-load conditions is 260° C. However, in many applications, polytetrafluoroethylene is used under load, and the critical temperature up to which an article of polytetrafluoroethylene can be stably used is far lower than 260° C., depending on the structure, configuration and field of application of the article. Illustratively stated, the polymer is formed into various shaped articles, such as gaskets, sliding pads and the like, and the articles are often used under a heavy load. Polytetrafluoroethylene has an inherent property of creeping under a load, especially at high temperatures. For example, when a polytetrafluoroethylene article is used as a gasket, the gasket tends to be compressed and laterally flattens, due to the inherent creeping property of the polymer under high temperature and pressure, which undesirably leads to leakage at the fitting intended to be sealed by the use of the gasket. To prevent such leakage, it is periodically needed to retighten the bolts of abutting flanges so that a fluid tight seal is ensured with the gasket. However, such periodic retightening is a time consuming process, especially where flanges are numerous and awkwardly located. Similar problems occur with respect to a packing, a sliding pad, a bearing pad and the like as well. To obviate such problems, the article of polytetrafluoroethylene must be used at a temperature which is far lower than the above-mentioned 260° C. However, articles such as packings, gaskets, sliding pads and bearing pads must often be used at high temperatures. Therefore, there is a strong demand in the art for polytetrafluoroethylene articles having improved heat resistance.

In the field of gaskets, primarily, two measures have been taken to deal with the problem of polytetrafluoroethylene creeping. One is to incorporate a filler material such as glass fiber, graphite, carbon fiber and zirconium oxide into the polytetrafluoroethylene. The other is to combine polytetrafluoroethylene or a filler material-incorporated polytetrafluoroethylene as mentioned above with a material having less of a tendency to creep, as seen in jacketed and spiral wound gaskets. The effect of such measures is apparent from the following data. The critical temperatures up to which the polytetra-fluoroethylene-based gaskets can be stably used are 100°–120° C. in the case of a flat gasket consisting purely of polytetrafluoroethylene, 150°–200° C. in the case of a flat gasket comprised of polytetrafluoroethylene and a filler material, 150°–180° C. in the case of a jacketed gasket and 260°–300° C. in the case of a spiral wound gasket. As seen from the foregoing, with respect to the flat gasket, the incorporation into polytetrafluoroethylene of a filler material, tends to improve the above-mentioned critical temperature by about 50° to 100° C. However, the flat gasket comprised of polytetrafluoroethylene and a filler material is not satisfactory since the gasket is still insufficient in creep resistant properties at high temperatures, and since some types of filler materials cause the gasket to have a decreased resistance to chemicals. On the other hand, the jacketed and spiral wound gaskets tend to have problems with respect to the resistance to chemicals, and they are disadvantageous in that for these, a high clamping pressure is needed and thus they cannot be formed into complex forms. Therefore, there is still a strong demand in the art for polytetrafluoroethylene-based gaskets which have excellent creep resistant properties and are free from the above-mentioned disadvantages. With respect to the sealants, other than gaskets, such as valve sealants, e.g. ball valve seats and gate valve seats, and dynamic sealants, e.g. gland packings, U packings and V packings, polytetrafluoroethylene is also advantageously used when they are required to have anticorrosive properties. Improvement of the compression creep resistance of the article is also strongly desired in the art for the reasons as mentioned above with respect to gaskets.

Polytetrafluoroethylene is also important as an anticorrosive lining material. However, it has a drawback in that it tends to be accompanied by a blistering phenomenon, especially in the pipes for a gas-phase fluid, which is fatal from the viewpoint of the purpose of the lining. Hence, improvement of the blistering resistant properties of the polytetrafluoroethylene article is strongly desired in the art.

With a view to improving the creep resistant properties of polytetrafluoroethylene articles, proposals have been made. (See U.S. Pat. No. 4,388,259 and U.S.S.R. Patent No. 405,732). Specifically, to improve the creep resistant properties of a polytetrafluoroethylene gasket, it has been proposed, as disclosed in U.S. Pat. No. 4,388,259, to manufacture a gasket by a method comprising (a) heating a fluorocarbon polymer sheet of predetermined thickness to within the temperature range at which the fluorocarbon polymer enters the gel state; (b) compressing said heated sheet to a thickness less than the above-mentioned predetermined thickness; (c) cooling the sheet in its compressed state; and (d) cutting the sheet, in its compressed, cooled state, into a gasket. However, the gaskets as manufactured according to the method of the patent do not have desirable creep resistant properties. On the other hand, with respect to U.S.S.R. Patent No. 405,732, in one of the two Examples described in the specification thereof there is disclosed the rolling of polytetrafluoroethylene to attain a high orientation of the polymer. Rolling is generally employed to produce a monoaxially oriented continuous sheet. In the roll orientation, it is necessary to conduct rolling while applying the tensile force in the lengthwise direction of the sheet and to release the tensile force only after cooling the sheet. Rolling is not suitable for effecting biaxial or multi-axial orientation of the polymer molecules. The other Example of the U.S.S.R. patent discloses compression of a preformed sheet of polytetrafluoroethylene in a press mold corresponding in form and dimension to the ultimate packing so as to cause the ratio of the thickness of the preformed sheet to the thickness of the ultimate packing to be 1.2 or more, which ratio may be regarded as a draw ratio. However, according to this method, the maximum value of the ratio is at most about 2.0 and a shaped article of a highly oriented polytetrafluoroethylene cannot be obtained. Therefore, the products obtained in the U.S.S.R. patent are not desirable with respect to the orientation of the tetrafluoroethylene polymer molecules and the creep resistant properties.

SUMMARY OF THE INVENTION

The present inventors have conducted extensive studies with a view toward developing an article of a tetrafluoroethylene polymer which has excellent creep resistant properties and is free from the blistering problem as mentioned above. As a result, it has been unexpectedly found that as illustrated in FIG. 10 which will be explained later in detail, there is a linear relationship between the draw ratio as defined later of a shaped article of an oriented ultrahigh molecular polytetrafluoroethylene polymer and the compression set as a criterion of creep resistant properties (the smaller the compression set, the better the creep resistant properties, while the larger the compression set, the worse the creep resistant properties) of the shaped article. That is, as the draw ratio of the article is increased, the compression set of the article linearly decreases. In other words, a shaped article of an ultrahigh molecular tetrafluoroethylene polymer having desirable creep resistant properties can be obtained by increasing the draw ratio of the article. From a practical point of view, the draw ratio of the article may preferably be at least 3. Further, as is seen from FIG. 10, it has also been found that after the draw ratio has reached a point of about 5, the compression set becomes nearly constant irrespective of the increase of the draw ratio of the article. That is, when the draw ratio is about 5 or more, a shaped article of an ultrahigh molecular tetraflurroethylene can enjoy stable high creep resistant properties. Moreover, it has been found that to ensure the desirable creep resistant properties for a shaped article of an ultrahigh molecular tetrafluoroethylene polymer, the polymer should be at least biaxially oriented and the orientation release stress as defined later of the shaped article must be high, preferably at least 5 Kg/cm$^2$. It has also unexpectedly been found that the shaped article comprising an at least biaxially oriented tetrafluoroethylene polymer having a draw ratio of at least 3 and an orientation release stress of at least 5 Kg/cm$^2$ exhibits desirable gas barrier properties, which are advantageous in obviating the above-mentioned blistering problem. Further, to ensure the desirable gas barrier properties for the shaped article, the specific gravity of the article must be high, preferably at least 1.8. The present invention has been completed based on these novel findings.

It is, therefore, an object of the present invention to provide a novel shaped article of a tetrafluoroethylene polymer having improved compression creep resistant and gas barrier properties.

The foregoing and other objects, features and advantages of the present invention will be apparent to those skilled in the art from the following detailed description and appended claims taken in connection with the accompanying drawings.

DETAILED DESCRIPTION OF THE INVENTION

Figure 1:
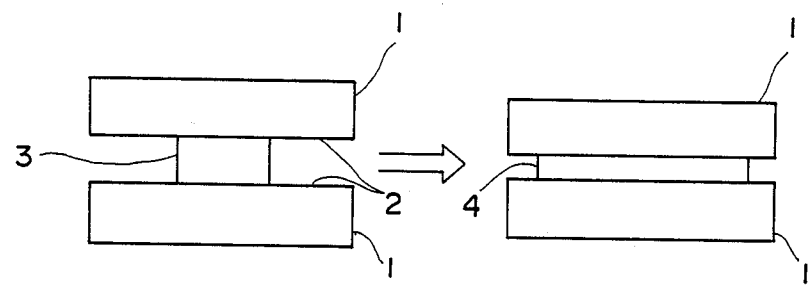
FIG. 1 shows a diagrammatic cross-sectional view illustrating a mode of orienting a preformed tetrafluoroethylene polymer sheet by the use of compression dies to obtain a shaped article of the present invention.

In one aspect of the present invention, there is provided a shaped article comprising a tetrafluorethylene polymer comprising an at least biaxially oriented tetrafluoroethylene polymer having a number average molecular weight of at least about $10^6$, which has a draw ratio (D) of at least 3.0, a specific gravity of at least 1.8 and an orientation release stress at 200° C. of at least 5 Kg/cm$^2$.

The configuration of the shaped article of the present invention is not critical. Generally, however, it is in a sheet form. The term "sheet" is used herein in its broadest sense, and means any wide, thin piece of material including those usually called "film" and "plate". The sheet-form article of the present invention may be flat or curved. The flat sheet-form article may be, for example, in a disk form or a ring form. The curved sheet-form article may be, for example, in a cylindrical form, a columnar form, a dish form or a pipe form. The flat sheet-form article and curved sheet-form article according to the present invention may be manufactured in substantially the same manner. For example, both may be manufactured by subjecting a preformed article to compression molding or extrusion molding as described later, in which use is made of dies, each having a flat surface in the case of manufacturing the flat sheet-form article and dies each having a curved surface in the case of manufacturing the curved sheet-form article. As is customary in the art, a shaped article having a complicated configuration may be manufactured by fabricating or machining a shaped article having a simple configuration. The thickness of the sheet-form shaped article according to the present invention may be appropriately selected according to the use of the article. Generally, however, the thickness of the shaped article of the present invention is in the range of at least 0.1 mm, preferably from 0.25 to 20 mm.

The tetrafluoroethylene polymer, to be used as a matrix resin of the shaped article of the present invention, may be a homopolymer of tetrafluoroethylene or a tetrafluoroethylene-based copolymer having a tetrafluoroethylene content of at least 70% by mole, preferably at least 90% by mole. The tetrafluoroethylene polymer may also be a blend of the homopolymer and a copolymer or of a blend of copolymers. The tetrafluoroethylene polymer should be of an ultrahigh molecular weight and, specifically, the number average molecular weight, as measured in accordance with the method described later, of the polymer may be in the range of generally from about $10^6$ to about $10^8$, preferably from about $2 \times 10^6$ to about $10^8$, more preferably from about $5 \times 10^6$ to about $5 \times 10^7$. Of the tetrafluoroethylene polymers as mentioned above, the homopolymer of tetrafluoroethylene of ultrahigh molecular weight is most preferred. Examples of the above-mentioned comonomer include perfluoroalkyl vinyl ether, hexafluoropropylene, ethylene, chlorotrifluoroethylene and the like. The tetrafluoroethylene polymers are known in the art and may be produced according to customary procedures.

The shaped article of the present invention may contain at least one filler material selected from inorganic filler materials such as a glass fiber, a carbon fiber, graphite, carbon, molybdenum disulfide, a bronze, zirconium oxide, zirconium silicate and the like, and organic filler materials such as an aromatic polyamide fiber, an aromatic polyester fiber and the like. The filler material content of the shaped article is not critical, but is preferably not greater than about 60% by weight. The shaped article of the present invention may further contain other types of thermoplastic resins such as polyethylene, polyvinyl chloride, polystyrene, polyvinyl acetate and the like, and may also contain an additive such as plasticizer, dye or the like. It is preferred that the content of such additives in the shaped article not be greater than about 10% by weight.

The shaped article of the present invention comprises an at least biaxially oriented tetrafluoroethylene polymer. The terminology "at least biaxially oriented tetrafluoroethylene polymer" as used herein means that the tetrafluoroethylene polymer is biaxially oriented or multi-axially oriented. In the case of biaxial orientation, the polymer is stretched in two directions perpendicular to each other to form a shaped article so that the polymer molecules of the article are principally oriented in the two stretching directions. On the other hand, in the case of multi-axial orientation, the polymer is subjected to, for example, compression molding or extrusion molding as described later so that the polymer molecules of the resulting article are almost uniformly oriented in all directions (360°). In the present invention, monoaxially oriented tetrafluoroethylene polymers, those which may be obtained by stretching in a single direction or rolling these polymers so as to cause the molecules of these polymers to be monoaxially oriented, are not suitable. Even an article of a monoaxially oriented tetrafluoroethylene polymer may exhibit an improved compression creep resistance as compared with that of the non-oriented tetrafluoroethylene polymer article. However, for example, when a compressive force is applied to a sheet-form article of a monoaxially oriented tetrafluoroethylene polymer at a high temperature, i.e. 100° C. or more, the article is shrunk in the stretching axis direction, and is extended in the direction rectangular therewith. As a result, a substantial dimensional change occurs in the article. Hence, the monoaxially oriented polymer article does not suit the actual applications. With respect to the biaxially and multi-axially oriented tetrafluoroethylene polymers being used as a matrix resin of the shaped article of the present invention, such undersirable anisotropic dimensional change does not occur. The multi-axially oriented tetrafluoroethylene polymer is generally more preferable than the biaxially oriented tetrafluoroethylene polymer.

The shaped article of the present invention may be produced by subjecting a preformed article of a tetrafluoroethylene polymer to at least biaxial orientation. The preformed article may be manufactured according to customary procedures. For example, this article may be manufactured by compressing a tetrafluoroethylene polymer powder at about room temperature and under a pressure of from about 100 to about 1000 Kg/cm$^2$, to form a molded article, sintering the molded artice at a temperature greater than that at which the polymer enters the gel state, preferably not lower than 327° C., more preferably from 340° to 400° C., and followed by cooling the molded article. It is desirable that the preformed article have a specific gravity of at least 1.8, preferably at least 2. As described later, the preformed article may be compressed between opposing dies as illustrated in FIG. 1, to which dies a lubricant has been applied, at a temperature of from 170° to 400° C., thereby causing the tetrafluoroethylene polymer to be at least biaxially oriented to obtain a shaped article having a draw ratio of at least 3.0, a specific gravity of at least 1.8 and an orientation release stress at 200° C. of at least 5 Kg/cm$^2$.

In biaxial orientation, generally, the two axes of stretching may be in the same plane and perpendicular to each other. The directions of two such axes are respectively referred to as the "longitudinal direction" and the "lateral direction" in the following descriptions for the sake of convenience. In general, in the biaxial orientation, the ratio of the extension in the longitudinal direction to the extension in the lateral direction may be arbitrarily varied. However, the above-mentioned ratio with respect to the shaped article of a biaxially oriented tetrafluoroethylene polymer according to the present invention is generally in the range of from 1:3 to 1:1, preferably from 1:1.5 to 1:1. On the other hand, with respect to the shaped article of a multi-axially oriented tetrafluoroethylene polymer according to the present invention, it is preferred that the extensions be approximately identical in all of the directions of the orientation. That is, with respect to the shaped article of a multi-axially oriented tetrafluoroethylene polymer according to the present invention, the ratio of the extension in the direction of orientation in which the extension is the smallest, to the extension in the direction of orientation in which the extension is the largest, (hereinafter referred to as the ratio of the minimum extension to the maximum extension), is in the range of generally from 1:2 to 1:1, preferably from 1:1.5 to 1:1, more preferably from 1:1.2 to 1:1. Shaped articles of a biaxially oriented tetrafluoroethylene polymer having a ratio of the extension in the longitudinal direction to the extension in the lateral direction of more than 1:3 have characteristics similar to those of an article of a monoaxially oriented tetrafluoroethylene polymer. That is, when a pressure of, for example, more than 100 kg/cm$^2$ is applied to such a shaped article of a biaxially oriented tetrafluoroethylene polymer at a temperature of more than 100° C., the compression set of the article may be small, but anisotropic dimensional changes occur. This also applies in the case of an article of a multi-axially oriented tetrafluoroethylene polymer in which the ratio of the minimum extension to the maximum extension is more than 1:2. The anisotropic dimensional change is especially undesired for sealant materials.

Figure 10:
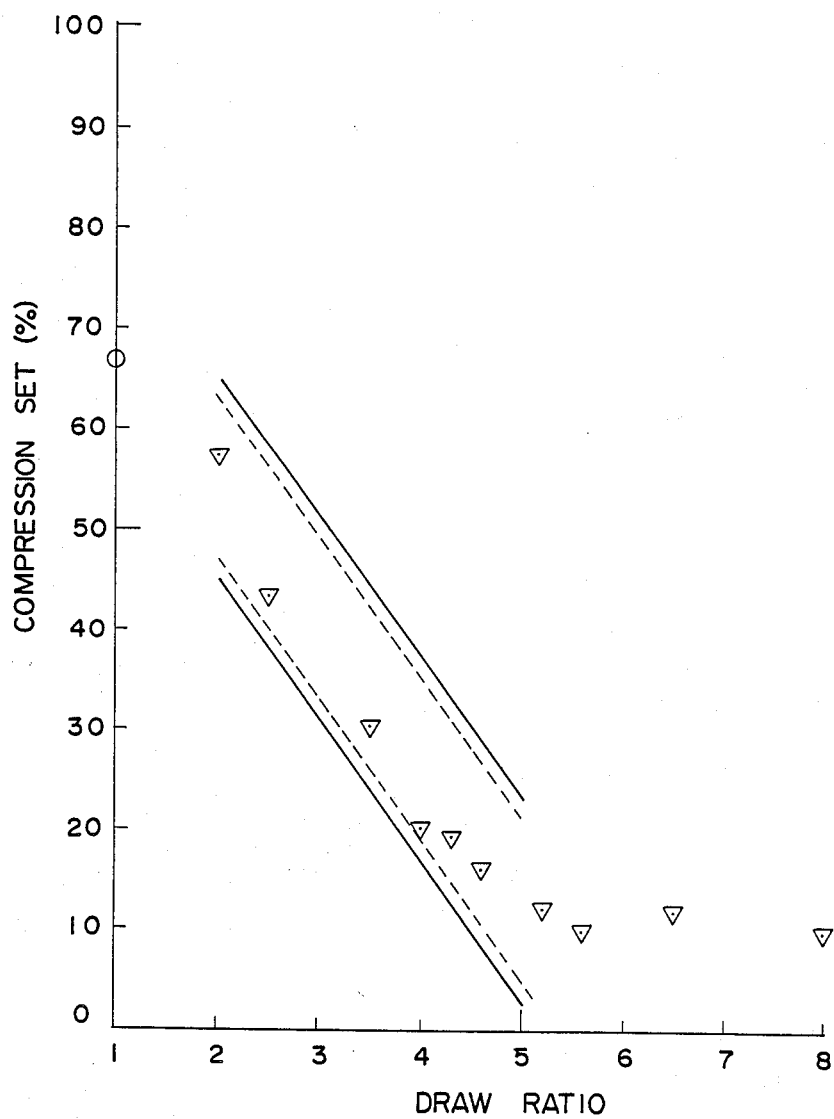
FIG. 10 is a graph showing the relationship between the draw ratio and compression set with respect to a shaped article of a tetrafluoroethylene polymer.

As mentioned hereinbefore, a shaped article of an ultrahigh molecular tetrafluoroethylene polymer having desirable creep resistant properties can be obtained by increasing the draw ratio of the article. In the present invention, the draw ratio of the article should be at least 3. As also mentioned hereinbefore, when the draw ratio is about 5 or more, the shaped article can further enjoy stable high creep resistant properties. Illustratively stated, as is seen from FIG. 10, with respect to the shaped articles of an oriented tetrafluoroethylene polymer having a draw ratio up to about 5, the compression creep resistant properties of the articles increase in proportion to the draw ratio, and the compression set (S) as measured at 200° C. under a load of 500 Kg/cm$^2$ for 1 hr generally satisfies the formula $$S(\%) = -14D + (83 \pm 10),$$

most usually the formula $$S(\%) = -14D + (83 \pm 8),$$

wherein D represents the draw ratio, as illustrated in FIG. 10. The above first formula corresponds to the solid straight line in FIG. 10 and the above second formula corresponds to the dotted straight line in FIG. 10. As is also seen from FIG. 10, when the shaped article of an at least biaxially oriented tetrafluoroethylene polymer has a draw ratio exceeding about 5, the compression set (S) of the article becomes stable and is generally 15% or less. Incidentally, the values of the compression set (S) as indicated herein are those obtained by the measurement at 200° C. under a load of 500 Kg/cm$^2$ for 1 hr. The values of the compression set (S) as measured under such conditions can also represent well the general compression creep resistant properties of a shaped article of an oriented tetrafluoroethylene polymer under even both milder and more severe conditions than the above-mentioned conditions employed for the measurement.

As mentioned before, in the present invention, the draw ratio of the shaped article according to the present invention should be at least 3. However, the manufacturing of a shaped article having an extremely high draw ratio often tends to be accompanied by breakage problems. From the viewpoints of avoidance of such breakage problems and attainment of desired properties of the shaped article of an oriented tetrafluoroethylene, the draw ratio may be advantageously in the range of from 3 to 20, more advantageously in the range of from 4 to 15, most advantageously in the range of from more than 5 to 10.

Figure 4:
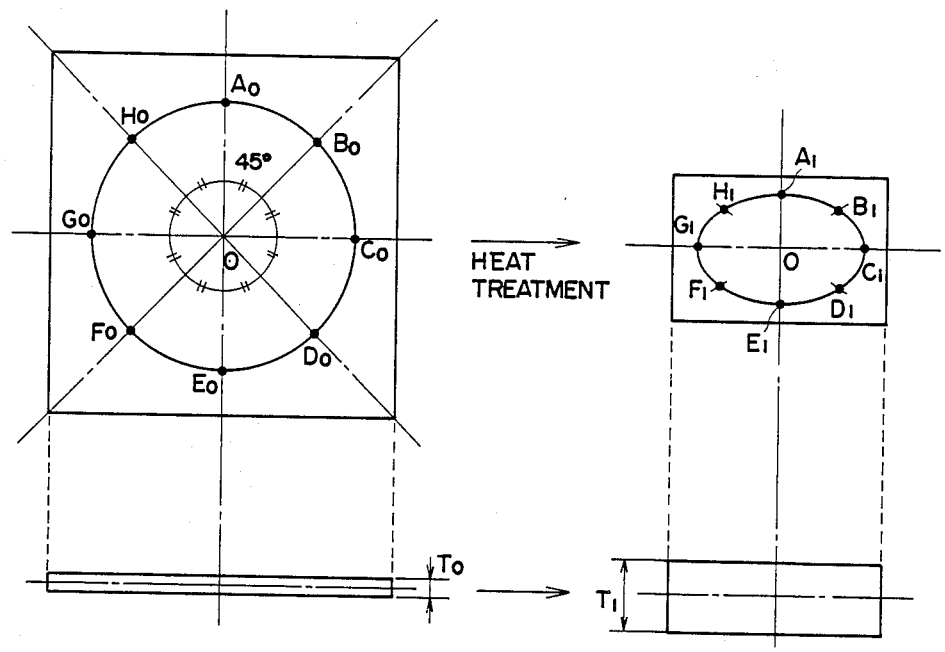
FIGS. 4 and 5 show diagrammatic plan views and cross-sectional views illustrating how the draw ratio and extension are determined with respect to a sheet-shaped article of an oriented tetrafluoroethylene polymer.
Figure 5:
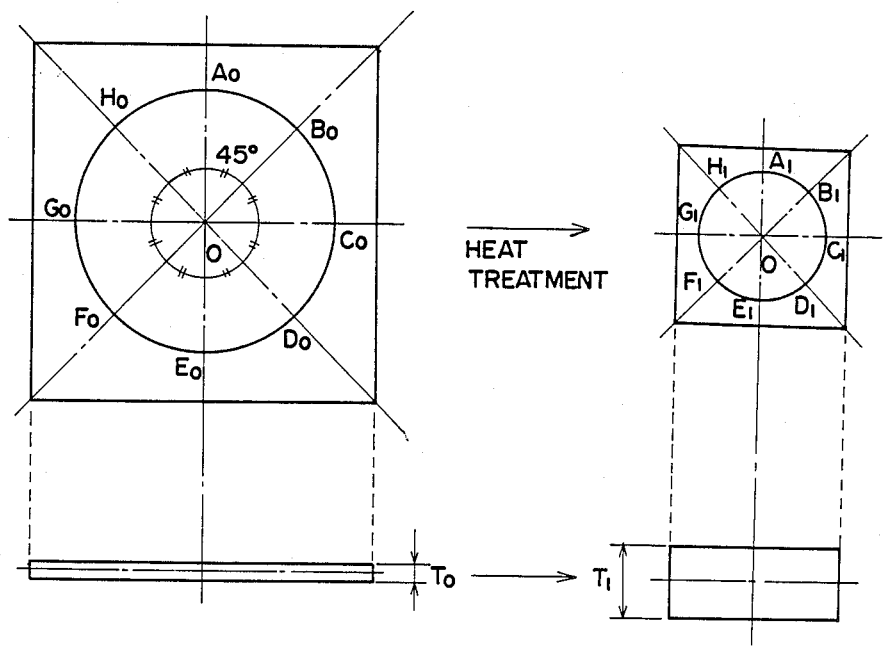

The terminology "draw ratio", "extension in the direction of orientation" and "multi-axial orientation" as used herein are explained in detail below with reference to FIGS. 4 and 5. Referring to FIG. 4, a circle having a radius r (OA$_0$, OB$_0$, OC$_0$, OD$_0$, OE$_0$, OF$_0$, OG$_0$, OH$_0$), for example 50 mm, is drawn at 25° C. on the surface of a test specimen of for example, 110 mm in length, 110 mm in width and T$_0$ mm in thickness blanked from a sheet-form article of an at least biaxially oriented tetrafluoroethylene polymer to obtain specimen (a) as shown on the left side of FIG. 4. The specimen (a) is subjected to heat treatment in accordance with ASTM D-1457. By the heat treatment, the orientation in the at least biaxially oriented polymer sheet is released and the size of the tetrafluoroethylene polymer sheet is caused to become substantially the same as that of the polymer sheet before the orientation, thereby obtaining specimen (b). The draw ratio (D) is defined as the ratio of the thickness of specimen (b) to that of specimen (a). That is, $D = T_1/T_0$. The circle drawn on the plane of the polymer sheet shrinks in the directions and degree respectively corresponding to the directions of stretching and the degree of stretching. The circle generally shrinks into an ellipse as illustrated in the right-hand view of FIG. 4. The straight lines including the largest diameter and the smallest diameter are hereinafter referred to as the lateral axis of orientation and the longitudinal axis of orientation, respectively. The extension in the direction of the longitudinal or lateral axis of orientation is defined as the ratio of the distance between predetermined two points on the longitudinal or lateral axis of orientation on specimen (a) to the distance between the corresponding predetermined two points on specimen (b). That is, the extensions in the directions of the lateral and longitudinal axes of orientation are given by $OC_0/OC_1$ (or $OG_0/OG_1$ or $C_0G_0/C_1G_1$) and $OA_0/OA_1$ (or $OE_0/OE_1$, or $A_0E_0/A_1E_1$), respectively. With respect to the shaped article of a tetrafluoroethylene polymer according to the present invention, it is preferred that the extension in every direction of orientation of the sheet be substantially identical, as illustrated in FIG. 5. Generally, with respect to the shaped article of the present invention, the standard deviation ($\sigma$) of the extensions in varied directions ($OA_0/OA_1$, $OB_0/OB_1$, $OC_0/OC_1$, $OD_0/OD_1$, $OE_0/OE_1$, $OF_0/OF_1$, $OG_0/OG_1$, and $OH_0/OH_1$) satisfies the inequality $\sigma \leq 0.9$. In the present invention, the multi-axial orientation is considered to be a special case of the the at least biaxial orientation, and the terminology "multi-axially oriented" is intended to mean an oriented state in which the standard deviation ($\sigma$) of the extentions satisfies the inequality $\sigma \leq 0.5$, preferably $\sigma \leq 0.2$.

The shaped article of an at least biaxially oriented tetrafluoroethylene polymer according to the present invention is a solid material containing substantially no voids and has a specific gravity of 1.8 or more, preferably 2.0 or more, more preferably 2.1 or more. In the present invention, the specific gravity is determined in accordance with ASTM D 792.

Within the shaped article of an at least biaxially oriented ultrahigh molecular tetrafluoroethylene polymer according to the present invention, the molecules of the polymer are oriented but still sufficiently entangled. Therefore, when the oriented shaped article of the present invention is heated, it exhibits an orientation release stress which indicates the degree of orientation of polymer molecules. The shaped article of an oriented tetrafluoroethylene polymer according to the present invention has an orientation release stress at 200° C. of 5 Kg/cm² or more, preferably 7 Kg/cm² or more, more preferably 10 Kg/cm² or more. However, it is preferred that the orientation release stresses do not exceed 40 Kg/cm². When the orientation release stress at 200° C. is less than 5 Kg/cm², the resistance of the oriented shaped article to compression creep is not desirably improved as compared to a non-oriented shaped article. In the present invention, the orientation release stress is determined according to ASTM D 1504, as described later referring to FIG. 9.

The method of orienting a tetrafluoroethylene polymer having a number average molecular weight of at least about $10^6$ is not limited insofar as a shaped article of an at least biaxially oriented tetrafluoroethylene polymer having a draw ratio of at least 3.0, a specific gravity of at least 1.8 and an orientation release stress at 200° C. of at least 5 Kg/cm² is obtained. For example, the shaped article of the present invention may be effectively manufactured by a method comprising subjecting a preformed article of a tetrafluoroethylene polymer as produced according to customary procedures to compression molding or extrusion molding in which the polymer flows in a manner of plug flow (or piston flow) in the dies. The preformed article usually in the form of a sheet having a thickness e.g. 2 mm or more can be produced according to customary procedures. For example, it may be produced by compressing a tetrafluoroethylene polymer powder at room temperature or so under a pressure of from about 100 to about 1000 Kg/cm² to form a molded article, and sintering the molded article at a temperature greater than that at which the polymer enters the gel state, preferably not lower than 327° C., more preferably from 340° to 400° C., followed by cooling. The preformed article of the tetrafluoroethylene polymer may be preheated prior to the orientation thereof to a temperature of 150° C. or more, preferably 170° to 340° C., more preferably 200° to 340° C., most preferably 300° to 327° C. The distribution of the temperature in the preheated preformed article may be either uniform or non-uniform. For example, the preheating may be effected in such a non-uniform manner that the preheated article has a relatively high temperature on its surfaces ad a relatively low temperature in its central portion, or that only the surface of the preformed article of the tetrafluoroethylene polymer has a temperature higher than the melting point of the tetrafluoroethylene polymer and the remaining inner portions of the preformed article have a temperature lower than the melting temperature of the tetrafluoroethylene polymer.

In effecting compression molding or extrusion molding, the temperature of the dies may be determined taking into account the moldability of the tetrafluoroethylene polymer and the productivity of the article so far as the temperature of at least the inner surfaces of the dies is not lower than the temperature corresponding to the temperature of the surfaces of the preformed article of the tetrafluoroethylene polymer minus 100° C. It is preferred that such temperatures do not exceed 400° C.

The compression pressure to be applied to the preformed article of the tetrafluoroethylene polymer in effecting compression molding or extrusion molding is about 10 Kg/cm² or more, preferably about 50 Kg/cm² or more, more preferably from about 80 to about 2000 Kg/cm².

To manufacture the shaped article of the present invention, it is extremely important to conduct the orientation of the preformed article of a tetrafluoroethylene polymer under conditions such that the plug flow of the polymer is produced. To produce the plug flow of the polymer, it is preferred to effect at least one of the following procedures in the orientation step:

(1) to apply a lubricant to the inner surfaces of the dies; and
(2) to laminate on the preformed article of the tetrafluoroethylene polymer a film of a tetrafluoroethylene polymer or other thermoplastic resin which preferably has a melting point lower than the melting point of the tetrafluoroethylene polymer and/or a melt viscosity lower than the melt viscosity of the tetrafluoroethylene polymer.

The lubricant may be applied to the inner surfaces of the dies in the following manner. In the case of compression molding, the lubricant may be applied to the inner surfaces of the dies before molding. In the case of extrusion molding, the lubricant may be introduced, slowly, stably and continuously, into the extrusion dies or may be applied to the inner surfaces of the dies during molding. Various known lubricants may be employed in the present invention. Of these, however, a silicone oil may be most suitable because it has excellent heat resistance.

The laminating on a preformed article of a tetrafluoroethylene polymer a film of a tetrafluoroethylene polymer or other thermoplastic resin has the effects of not only ensuring the plug flow of the tetrafluoroethylene polymer but also enabling the applied lubricant to be readily removed by stripping the film of the thermoplastic resin from the oriented article. Even in the case in which a tetrafluoroethylene polymer film is laminated on the tetrafluoroethylene polymer, the film can be readily stripped from the oriented article even after heating of the laminated tetrafluoroethylene polymer article at a temperature around the melting point of the tetrafluoroethylene polymer under pressure because the tetrafluoroethylene polymers do not adhere to each other. As the material of the other polymer resin film for laminating a preformed article of a tetrafluoroethylene polymer for the purpose of ensuring the plug flow of the tetrafluoroethylene polymer and for the purpose of the removal of the applied lubricant from the oriented article, there may be mentioned various resins, such as ultrahigh molecular polyethylene, poly(4-methylpentene-1) and polytetrafluoroethylene. The thickness of the film is not critical. However, the thickness is generaldy in the range of from about 10 to about 2000 μm, preferably from about 50 to about 1000 μm. In the case in which the plug flow of the tetrafluoroethylene polymer is insufficient at the time of orienting a tetrafluoroethylene polymer, if a pressure is continuously applied onto the polymer for the purpose of orienting the polymer, melt fracture or brittle fracture tends to occur in the tetrafluoroethylene polymer. Moreover, when a tetrafluoroethylene polymer is oriented under conditions in which the plug flow of the polymer is difficult to be generated, the orientation of the resultant article becomes non-uniform and the article has portions where the mechanical strength is not sufficient. Such articles are especially unsuitable as a high-pressure sealant which is required to have a high compressive break resistance.

When a preformed article of a tetrafluoroethylene polymer is oriented between opposing dies having a sufficient amount of a lubricant applied to the inner surfaces thereof so that the friction between the preformed article and the inner surfaces of the dies is decreased, a multi-axially oriented shaped article which is uniformly oriented in all directions can be obtained.

Conventional rolling and pull-stretching generally employed as an orientation method of a polymer are not suitable in the present invention since they have various drawbacks. That is, by rolling, orientation of the polymer is effected only monoaxially at a single stretching step and, hence, in order to effect biaxial orientation at least two stretching steps are needed. In effecting biaxial orientation by rolling, an increased number of stretching steps are required to attain a good balance between the extension in the longitudinal direction and the extension in the lateral direction. Hence, rolling is not suitable for manufacturing the biaxially or multi-axially oriented article of a tetrafluoroethylene polymer having a draw ratio of at least 3.0, a specific gravity of at least 1.8 and an orientation release stress at 200° C. of at least 5 Kg/cm² according to the present invention. On the other hand, when the pull-stretching method is employed for biaxial or multi-axial orientation of a tetrafluoroethylene polymer, voids are inevitably generated or increased in the ultimate article. This may be understood by the fact that pull-stretching is generally known to be useful for producing a porous tetrafluoroethylene polymer article. Therefore, the pull-stretching method is also not suitable for manufacturing the shaped article of the present invention.

The shaped article of an oriented tetrafluoroethylene polymer as obtained by orienting a preformed article of a tetrafluoroethylene polymer generally undergoes undesirable reversion of the orientation even at relatively low temperatures of 100° C. or less. For example, when such an oriented article is allowed to stand in the air at 80° C. for 20 hours, an undesirable dimensional change (shrinkage in length) as large as about 3% disadvantageously occurs as a result of the reversion of the orientation. In order to avoid such an undesirable dimensional change, it is advantageous that the oriented article be subjected to heat treatment for effecting a free shrinkage of the article at a temperature of 70° to 150° C., preferably 70° to 120° C. The oriented article of a tetrafluoroethylene polymer which is improved with respect to dimensional stability according to the present invention has a shrinkage factor at 80° C. for 12 hours of 1.5% or less, preferably 1% or less, more preferably 0.6 % or less. The shrinkage factor as used herein is an arithmetic mean of the shrinkage degrees of a test piece measured with respect to four directions on the surface of the test piece, any neighbouring two of which have an included angle of 45°. The shrinkage of the test piece is conducted on a smooth solid surface at 80° C. for 12 hours. The shrinkage degree is represented by the formula:

$$\frac{l_0 - l_1}{l_0} \times 100$$

wherein $l_0$ represents the initial distance between two predetermined points along each direction on the test specimen, and $l_1$ represents the distance between the points corresponding to the above-mentioned two predetermined points along the direction on the test specimen after the shrinkage.

The temperature at which a shaped article of a tetrafluoroethylene polymer is transported and stored, generally does not exceed about 80° C. Therefore, in the shaped article according to the present invention, the shrinkage factor at 80° C. of which is generally 1.5% or less, can be advantageously utilized without being accompanied by undesirable dimensional changes during transportation and storage.

The thus manufactured shaped article may further be subjected to machining such as blanking, cutting or the like to obtain an ultimate product such as a gasket, packing, bearing pad, sliding pad or the like. Alternatively, the preformed article of a tetrafluoroethylene polymer may be oriented under pressure between opposing dies so that the preformed article is shaped into an ultimate product such as a gasket, packing, bearing pad, sliding pad or the like, simultaneously with the orientation. In the present invention, a uniformly oriented shaped article in the form of a gasket, packing, bearing pad, sliding pad or the like can be obtained more readily by first producing a large oriented sheet and then machining the sheet into a desired shape than the method in which the shaping into an ultimate product is conducted simultaneously with orientation of the tetrafluoroethylene polymer.

Next, the method of producing the shaped article of the present invention will be explained in more detail with reference to FIGS. 1 to 3 and FIGS. 6 to 7.

Referring to FIG. 1, at least the inner surfaces 2 of opposing compression dies 1 are preheated to a predetermined temperature which is not lower than a temperature corresponding to the temperature of the surface portions of a preformed sheet 3 of a tetrafluoroethylene polymer minus 100° C. The preformed tetrafluoroethylene polymer sheet 3 which has been preheated to 150° C. or more is placed between the preheated compression dies 1. At this stage, it is preferred that a lubricant be applied to the internal surfaces 2 of the compression dies 3. The preformed tetrafluoroethylene polymer sheet 3 is compressed so that the plug flow of the polymer is produced, thereby attaining a desired orientation of the polymer. Then, the oriented polymer sheet 4 is cooled, in its compressed state, to about 100° C. or less, and the dies 1 are opened to take out the sheet article of the oriented tetrafluoroethylene polymer of the present invention.

Figure 2:
FIG. 2 shows a set of diagrammatic cross-sectional views illustrating a preformed tetrafluoroethylene polymer sheet to be subjected to orientation (2-1-a), a preformed tetrafluoroethylene polymer sheet sandwiched between films which is to be subjected to orientation (2-1-b), two preformed tetrafluoroethylene polymer sheets, one piled on top of the other, which are to be subjected to orientation (2-2-a), and two preformed tetrafluoroethylene polymer sheets, one piled on top of the other and sandwiched between films, which polymer sheets are to be subjected to orientation (2-2-b)
Figure 2:
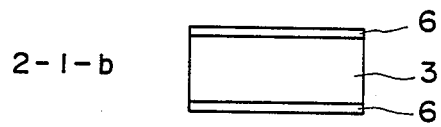
Figure 2:
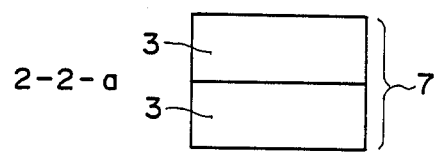
Figure 2:
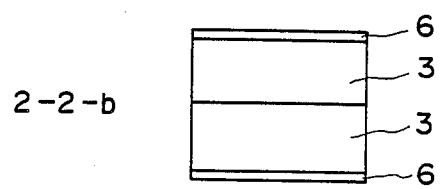
Figure 3:
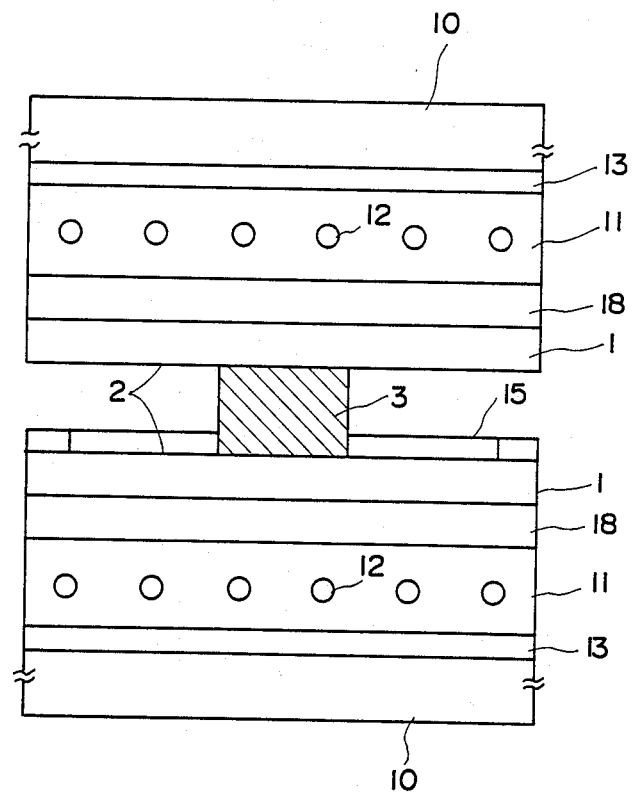
FIG. 3 shows a diagrammatic cross-sectional view illustrating the structure of a compression press which is suitable to orient a preformed tetrafluoroethylene polymer sheet to obtain a shaped article of the present invention.

To manufacture oriented tetrafluoroethylene polymer sheets having a small thickness or to manufacture a plurality of oriented tetrafluoroethylene polymer sheets by a single compressing operation in order to increase productivity, it is preferred that first a plurality of preformed tetrafluoroethylene polymer sheets 3 be piled on top of each other to obtain piled sheets 7, as illustrated in FIG. 2 (2-2-a), and then the piled sheets 7 be compressed between opposing dies. Further, to facilitate removal of the lubricant stuck to the surfaces of the compressed tetrafluoroethylene polymer sheets after orientation operations, it is preferred that a preformed tetrafluoroethylene polymer sheet 3 or the piled sheets 7 be sandwiched between films 6 of the same tetrafluoroethylene polymer or the other kind of thermoplastic resin to obtain a sandwiched sheet or sandwiched piled sheets, as illustrated in FIG. 2 (2-1-b and 2-2-b), and then the sandwiched sheet or the sandwiched piled sheets be compressed between opposing dies. When the compression of a preformed tetrafluoroethylene polymer has been effected in the manners as mentioned above, the sheets are separated from each other and/or from the films after completion of the orientation and cooling operations. The separation of a preformed tetrafluoroethylene polymer sheet even from another preformed tetrafluoroethylene polymer sheet or a film of the same tetrafluoroethylene polymer can be readily performed so long as the preformed tetrafluoroethylene polymer sheets are not heated to a temperature higher than the melting point of the polymer. On the other hand, separation of the oriented tetrafluoroethylene polymer sheet from a film of other thermoplastic resin can be generallly performed without any difficulty as long as the preformed article is not heated to a temperature higher than the melting point of the other thermoplastic resin, preferably a temperature corresponding to the melting point of the other thermoplastic resin minus 30° C. However, when there is employed a thermoplastic resin of which the viscosity does not decrease so much even at temperatures higher than the melting point of the resin as in the case of an ultrahigh molecular polyethylene, the temperature of the preformed article may be elevated to temperatures higher than the melting point of the resin without causing separation of the article from the resin to become difficult after the compression. Compression and cooling of the preformed article may be effected using a compression press as illustrated in FIG. 3. Referring to FIG. 3, die plates 10 of the compression press have heating and colling plates 11 (hereinafter referred to as "hot/cold die plates") attached hereto through heat insulators 13. In the hot/cold die plates 11, there are provided through holes for passing heating/cooling medium 12 to control the temperature of the die plates 11. To the hot/cold die plates 11 are fixed opposing dies 1 by way of insulators 18.

Prior to the compression of the tetrafluoroethylene polymer, the dies 1 are heated to a predetermined temperature which is not lower than a temperature corresponding to the temperature of the surface portions of the preformed sheet article minus 100° C. The preformed tetrafluoroethylene polymer sheet article 3 may be preheated to a temperature of not lower than 150° C., preferably 170° to 340° C. It is preferred that a lubricant be applied to the inner surfaces 2 of the dies 1 in advance. The preformed tetrafluoroethylene polymer sheet article 3 is oriented by compression under pressure. In effecting the compression, the thickness of the resulting article is adjusted by the use of a spacer 15 so that the draw ratio of the article is at least 3.0. The tetrafluoroethylene polymer sheet article in its compressed state is cooled to a temperature of not higher than 100° C., and then the resultant oriented tetrafluoroethylene polymer sheet is taken out. In cooling, the cooling rate is controlled by means of insulators 18 and hot/cold die plates 11. When the surfaces of dies 1 are curved for example in a circular arc form, the resultant shaped articles are curved in accordance with the surfaces of dies 1 and hot/cold die plates 11.

Figure 6:
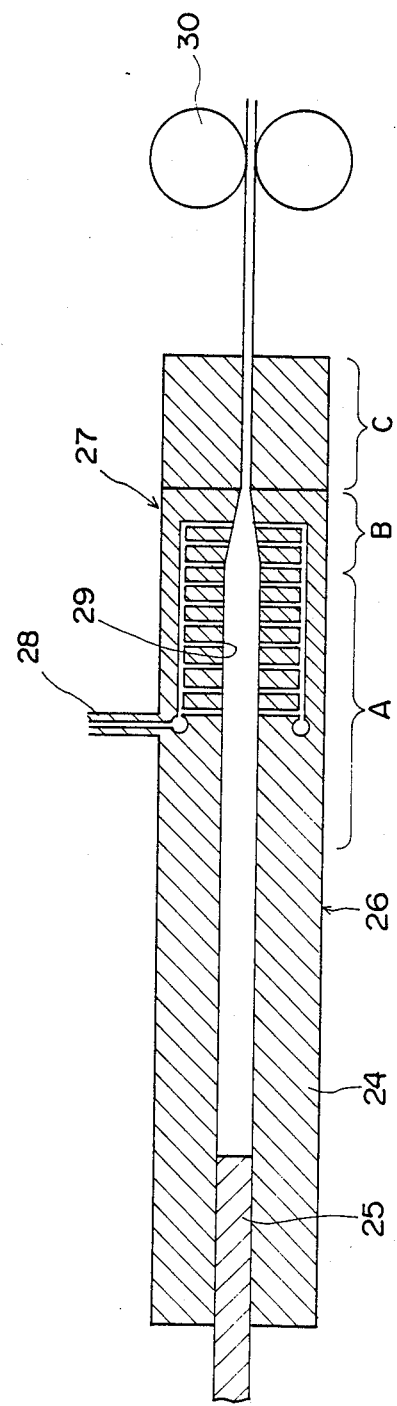
FIG. 6 shows a diagrammatic cross-sectional view illustrating another mode of orienting a preformed tetrafluoroethylene polymer by the use of a ram extruder to obtain a shaped article of the present invention.
Figure 7:
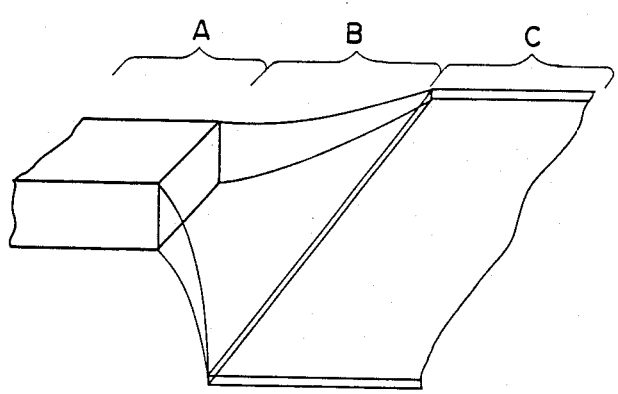
FIG. 7 shows a partial diagrammatic perspective view illustrating a dimensional change occurring at a part of the die of the ram extruder of FIG. 6 with respect to a tetrafluoroethylene polymer sheet in plug flow, which is undergoing multi-axial orientation.

The shaped article of the present invention may be also manufactured by using an extruding machine as illustrated in FIG. 6. Referring to FIG. 6, a preformed tetrafluoroethylene polymer sheet or a plurality of preformed tetrafluoroethylene polymer sheets, one piled on top of the other, as illustrated in FIG. 2 are introduced into a ram extruder 26 comprising a heating cylinder 24, the internal hollow of which is in the form of a square pillar having a square cross-section, and a square ram 25. Then, the preformed sheet or sheets are extruded through die 27 consisting of parts A, B and C by the square ram 25 while heating. In the middle of the part A of the die 27, a device is provided for causing a lubricant to ooze so as to be present between the surfaces of the preformed tetrafluoroethylene polymer sheet and the die. The lubricant under high pressure is guided through a passage 28 for introducing the lubricant to a plurality of lubricant-introducing ports 29, and oozes therefrom onto the surfaces of the tetrafluoroethylene polymer sheet so that the lubricant is caused to be present between the surfaces of the tetrafluoroethylene polymer sheet and the die. The lubricant-introducing ports 29 may be provided in the form of small slits or in the form of a hollow material such as a sintered metal having tiny communicating holes. In place of the use of the lubricant-introducing ports, the lubricant may be applied by spraying to the inner surfaces of the dies prior to starting extrusion molding. The tetrafluoroethylene polymer sheet or sheets having the lubricant uniformly applied to the surfaces thereof are extruded through the die 27 with the central portions of the polymer sheet moving at about the same speed as that of the surface portions of the sheet, i.e. in a manner of plug flow. Then, the sheet or sheets in plug flow are oriented at the part B of the die 27. The part B of the die 27 has such a structure that the thicknesses of the tetrafluoroethylene polymer sheet or sheets are gradually decreased. The dimensional change occurring in the part B of the die 27 with respect to the tetrafluoroethylene polymer sheet or sheets in plug flow, which are undergoing multi-axial orientation, is shown in FIG. 7. The tetrafluoroethylene polymer sheet or sheets while being in plug flow are extruded simultaneously in two directions, i.e. the direction of flow and the direction perpendicular thereto, so that the sheet or sheets are multi-axially oriented. The force of orienting the tetrafluoroethylene polymer sheet or sheets is attributed to the force of extrusion imparted by the ram extruder 26. The multi-axially oriented tetrafluoroethylene polymer sheet or sheets extruded are cooled at the part C of the die and are forced out of the die 27. The multi-axially oriented tetrafluoroethylene polymer sheet or sheets are rolled up by rolls 30. When the plurality of preformed sheets are extruded from the die 27, they are separated from each other to obtain a shaped article of an oriented tetrafluoroethylene polymer according to the present invention. The oriented tetrafluoroethylene polymer sheet article of the present invention manufactured by compression molding or extrusion molding as described above may further be subjected to machining such as cutting, blanking and slicing to obtain a shaped article of the present invention, in the form of a sealer, lining material, bearing pad, sliding pad or the like.

The shaped article of the present invention comprised of an at least biaxially oriented, ultrahigh molecular tetrafluoroethylene polymer and having a draw ratio of at least 3.0, a specific gravity of at least 1.8 and an orientation release stress at 200° C. of at least 5 Kg/cm$^2$ is excellent in compression creep resistant properties, as compared with the conventional tetrafluoroethylene polymer articles. Moreover, the oriented tetrafluoroethylene polymer article of the present invention has significantly improved gas barrier properties, tensile strength, etc.

The exact reasons as to why the oriented tetrafluoroethylene polymer article of the present invention is improved with respect to compression creep resistant properties have not yet been elucidated, but the following presumption may be made. The molecules of the tetrafluoroethylene polymer article respectively have ultrahigh molecular weights, relatively high rigidities and long molecular chains which are intricately entangled together. When the molecules are stretched to a great extent, the molecular chains between the points of entanglement reach a state of approximately uniform tension. Therefore, any external force applied to the oriented tetrafluoroethylene polymer article will be uniformly spread to each of the molecular chains and, hence, the phenomenon of free drainage of molecular chains at the points of entanglement is unlikely to occur. This is presumably the reason for markedly improved compression creep resistant properties of the shaped article of the present invention.

From the specific gravities of a tetrafluoroethylene polymer article measured before and after the orientation thereof, it has been confirmed that in the process of orienting a preformed tetrafluoroethylene polymer article between opposing dies under pressure, no significant change occurs in the content of void. Therefore, it is presumed that the reason why the gas barrier properties of the oriented tetrafluoroethylene polymer article of the present invention are improved is not a change in the content of void but a morphological change due to the orientation of the polymer molecules.

The shaped tetrafluoroethylene polymer article of the present invention is particularly useful in the fields where not only the inherent properties of the tetrafluoroethylene polymer, namely, chemical resistance, corrosion resistance, low frictional properties, non-stickiness and heat resistance but also the improved compression creep resistant and gas barrier properties are required. For example, the shaped article of the present invention can be advantageously utilized as a sealant such as a gasket and packing, a lining material, a bearing pad, a sliding pad and the like.

As mentioned above, the shaped tetrafluoroethylene polymer article of the present invention has excellent compression creep resistant properties, especially at high temperatures, as compared with those of the conventional polytetrafluoroethylene articles. Therefore, the upper limit temperature, upper limit sealant internal pressure and other upper limit conditions up to which the tetrafluoroethylene polymer article can be used become high with great advantages.

Specifically, the shaped article of the present invention can be advantageously used as, for example, packings such as V packings, U packings, O rings, diagonal packings and square-shaped packings, which packings are useful as a gland seal or the like for stirrers, valves, pumps, or the like. Further, the shaped article of the present invention can be advantageously utilized without being reinforced which differs from the conventional shaped articles of polytetrafluoroethylene which are usually reinforced into combination types, for example, jacketed gaskets, spiral wound gaskets, back-up ring, slipper seals or the like. The shaped article of the present invention can also be advantageously used as diaphragms and bellows which are parts of valves, since the conventional diaphragms and bellows have a drawback of being poor in mechanical strength. Still further, the shaped tetrafluoroethylene polymer article of the present invention is useful as balls which are used as check valves in liquid-transporting systems. The shaped tetrafluoroethylene polymer article of the present invention is also useful as ball valve seats in ball valves, gate valve seats in gate valves, valve disks, or the like. The shape and dimension of the present tetrafluoroethylene polymer article for use as the above-mentioned purposes may be easily designed in accordance with their actual application conditions. For example, for flat gaskets, the shaped article of the present invention is often used in the form of a sheet having a thickness of 0.2 mm to 5 mm, preferably 0.5 mm to 4 mm. In the application field of bearings, the conventional tetrafluoroethylene polymer articles are used under the conditions of a light load and a low sliding rate since they inevitably undergo large compression creep. By contrast, the oriented tetrafluoroethylene polymer articles of the present invention can be advantageously used even when a heavy load is imposed. Particularly, they are suitable for use as bearing pads and sliding pads for heavy constructions, such as bridges, outdoor tanks and plant frameworks, and they can enjoy high durability.

The oriented tetrafluoroethylene polymer article of the present invention which contains a filling material advantageously exhibits a further improved dimensional stability at high temperatures, further improved compression creep resistant properties, and further improved wear resistance.

As aforementioned, the shaped article of the present invention has excellent compression creep resistant and gas barrier properties as compared with those of the conventional polytetrafluoroethylene articles. Accordingly, the shaped article of the present invention is especially useful in fields in which the inherent properties of the tetrafluoroethylene polymer, such as resistance to chemicals, low frictional properties, non-staining properties, electrical insulating properties, resistance to low temperatures and the like, are appreciated but the applications of the polymer are limited due to its drawbacks with respect to compression creep and blistering.

DETAILED DESCRIPTION OF THE PREFERRED EMBODIMENTS

The present invention will now be described in more detail with reference to the following Examples that by no means limit the scope of the present invention.

In the following Examples, Comparative Examples and Referential Example, the properties of the polymers and the shaped articles were determined according to the following methods.

1. Draw ratio

Please see pages 24 to 26 of this specification.

2. Number average molecular weight

The number average molecular weight of a tetrafluoroethylene polymer is determined first by blanking a specimen from a tetrafluoroethylene polymer or an article of a tetrafluoroethylene polymer, second by effecting heat treatment therefor under heating conditions as prescribed in ASTM D-1457, third by measuring the specific gravity of the thus heated specimen, which is defined as the standard specific gravity (SSG) of the polymer, and finally by calculating the number average molecular weight of the polymer from the SSG in accordance with the formula [R. D. Doban et al: Meeting of the Am. Chem. Soc., Atlantic City (1956)]:

$$SSG = -0.0579 \log \overline{M}n + 2.6113$$

in which $\overline{M}n$ represents a number average molecular weight of the polymer.

With respect to the above formula, reference may be made to page 16 of Satokawa et al "Fusso Jushi (Fluoro Resins)" published by the Nikkan Kogyo Shimbun Ltd., Tokyo, Japan, in April, 1976.

3. Compression set (%)

Figure 8:
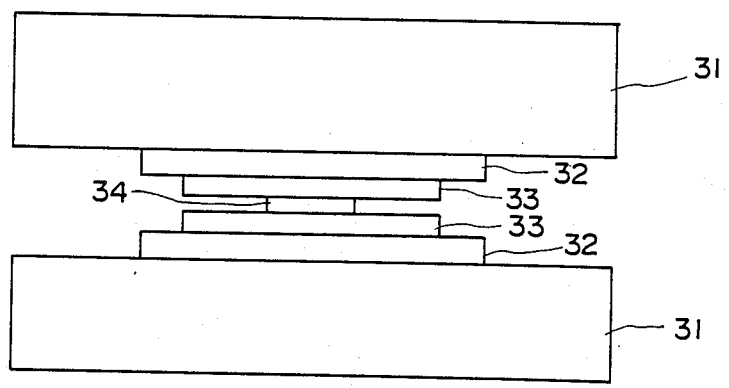
FIG. 8 shows a diagrammatic side view illustrating an apparatus for measuring the compression set of a shaped article of a tetrafluoroethylene polymer.

Referring to FIG. 8, a test piece 34 blanked from an oriented tetrafluoroethylene polymer sheet article or a comparative sheet article, which test piece is 50 mm in length, 50 mm in width and 1 to 3 mm in thickness, is sandwiched between smooth reinforced glass plates 33 of each 160 mm in length, 160 mm in width, and 5 mm in thickness. In advance, the surfaces of the reinforced glass plates and those of the test piece are cleaned using acetone or ethanol. The test piece 34 sandwiched between the reinforced glass plates 33 is further sandwiched between the mirror surfaces of planished stainless steel plates 32 (surface roughness according to Japanese Industrial Standard B 0601: 0.1 S-0.6 S) of 220 mm in length, 220 mm in width and 6 mm in thickness to form an assembly. The assembly is placed between hot press plates 31 of 400 mm in length, 400 mm in width and 60 mm in thickness preheated at 200° C. Then, a compressive force corresponding to a load of 500 Kg/cm² on the test piece 34 is applied to the assembly. In this instance, the area of the test piece slightly increases due to the deformation thereof by compression, but the loading with the above-mentioned compressive force is continued at a temperature of 200° C. for 1 hour. Then, the heater for the hot press plates 31 is switched off, and water is circulated through the hot press plates, thereby cooling the test piece to room temperature in about 30 minutes. The compressive force is maintained during the cooling. Thereafter, the test piece is taken out.

The thickness ($t_0$) of the test piece before compression and thickness ($t_1$) of the same after compression are measured at least 5 points of the test piece using a micrometer (Japanese Industrial Standard B 7503, Class 1). The compression set at each point is calculated by the formula:

$$\frac{(t_0 - t_1)}{t_0} \times 100.$$

The compression set as used herein is an arithmetic mean of the thus obtained values of compression set. The above procedures are essentially in accordance with ASTM D 621.

4. Orientation release stress (Kg/cm²)

Figure 9:
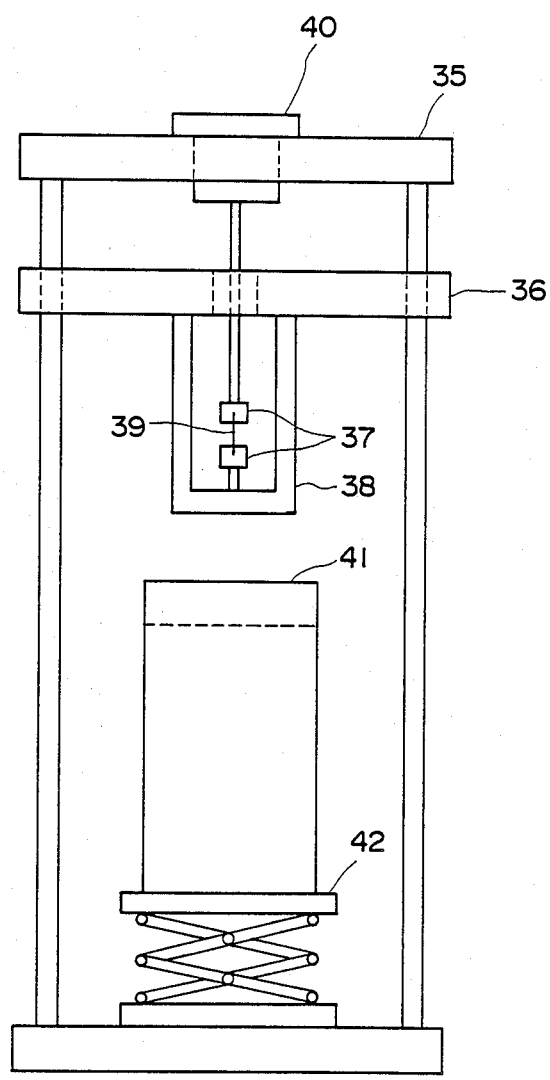
FIG. 9 shows a diagrammatic side view illustrating an apparatus for measuring the orientation release stress of a shaped article of a tetrafluoroethylene polymer.

The orientation release stress is measured in accordance with ASTM D 1504. FIG. 9 illustrates a measuring apparatus which has been prepared by modifying a customary tensile tester. The apparatus has a load cell 40 attached to the top of a frame 35 to sense the shrinking force of a test piece 39 which is secured by means of clamping jaws 37. The lower clamping jaws are fixed to a support 38 which extends from a cross head 36. The test piece 39 is heated by means of an oil bath 41, which can be lifted or descended by means of a lifter 42.

The test piece 39 is in the form of a strip having a length of 80 mm and a width of 100 mm (thickness is not limited) which is blanked from a shaped article of a tetrafluoroethylene polymer. Four test pieces are prepared by cutting out along four directions on the surface of the article, any neighboring two directions of which have an included angle of 45°. Each test piece 39 is secured by means of the upper and lower clamping jaws 37. The distance between the upper clamping jaws and the lower clamping jaws is set at 50 mm. Then, the oil bath 41 heated to 200° C. is lifted until the uppermost portion of the upper clamping jaws is immersed in the oil. The shrinking force of the test piece is sensed by the load cell 40, and recorded on a recorder (not shown). The shrinking force recorded on the recorder reaches a constant value about 5 minutes after the immersion of the test piece in the oil bath. The constant value is divided by the value of the cross-sectional area (thickness × width) of the test piece to convert it into a value of stress (Kg/cm²). The orientation release stress as used herein is an arithmetic mean of the stress values determined with respect to the four test pieces as described above.

5. Specific gravity

The measurement of specific gravity is carried out in accordance with ASTM D 792.

6. Moisture permeability (g/cm²·24 hr)

The moisture permeability of a tetrafluoroethylene polymer article is measured at 38° C., at a relative humidity of 90% in accordance with ASTM F 372.

7. Tensile strength at break (Kg/cm²) and Tensile elongation at break (%)

The tensile strength at break and the tensile elongation at break of a tetrafluoroethylene polymer article are measured in accordance with ASTM D 638 and ASTM D 882, respectively.

8. Whole light transmission (%) and Haze (%)

The whole light transmission and haze of a tetrafluoroethylene polymer article are measured in accordance with ASTM D 1003.

9. Oxygen permeability (ml/m²·day·atm)

The oxygen permeability of a tetrafluoroethylene polymer article is measured at 30° C. in accordance with ASTM D 1434.

EXAMPLE 1 and COMPARTIVE EXAMPLE 1

Preformed polytetrafluoroethylene sheets having varied thicknesses as manufactured according to the Free Baking method [Valflon (registered trade mark) No. 7000 manufactured and sold by Nippon Valqua Industry Ltd., Japan which has a specific gravity of 2.16 and a number average molecular weight of about $1 \times 10^7$] were each preheated at temperatures as indicated in Table 1, compressed using a compression press as illustrated in FIG. 3 provided with opposing dies having a temperature as indicated in Table 1, followed by heat treatment for free shrinkage as indicated in Table 1. With respect to the Free Baking method, reference may be made to pages 58 to 65 of Satokawa et al "Fusso Jushi (Fluoro resins)" published by the Nikkan Kogyo Shimbun, Ltd., Japan in April, 1976. Before compressing the preformed sheets, the inner surfaces of the opposing dies had been lubricated by means of a silicone oil (KF 965 manufactured and sold by Shinetsu Silicone K.K., Japan, which has a viscosity of about 10,000 cps at 25° C.). In compressing the preformed sheets, a 0.1 mm thick film of polytetrafluoroethylene was disposed between the upper surface of the preformed sheet and the inner surface of the upper die and between the lower surface of the preformed sheet and the inner surface of the lower die. The hot/cold die plate of the compression press was set at about 25° C. Thus, there were obtained oriented polytetrafluoroethylene sheet articles (Samples No. 101 to No. 107) each having a draw ratio (D), orientation release stress at 200° C. and compression set at 200° C. under 500 Kg/cm² for 1 hour as indicated in Table 1. The thickness of each of the oriented polytetrafluoroethylene sheet articles was 2 mm.

Substantially the same procedures as described above were repeated except that the draw ratio of the resulting article was smaller than 3.0 to obtain Comparative Samples No. 201 and No. 202.

The compression set values are plotted against the draw ratio values in FIG. 10. From the graph of FIG. 10, the following relationships have been found between the draw ratio (D) and the compression set (S) with respect to the polytetrafluoroethylene article.

$$2 \leq D \leq 5 \quad (i)$$

$$S = -14D + (83 \pm 10),$$

$$D \geq 5 \quad (ii)$$

$$S \leq 15.$$

EXAMPLE 2

A preformed polytetrafluoroethylene sheet of 10 mm in thickness containing a glass fiber as the filling material in an amount of about 20% by weight [Valflon (registered trade mark)/glass-filled, No. 7010, specific gravity 2.3, manufactured and sold by Nippon Valqua Industry Ltd., Japan] was multi-axially oriented in substantially the same manner as in Example 1 to obtain an oriented sheet article (Sample No. 108) having a thickness of 1.5 mm, a draw ratio of 6.5 and a specific gravity of 2.3. The orientation conditions and the test results are given in Table 1. As is apparent from Table 1, the oriented sheet article is low in compression set, that is, excellent in compression creep resistant properties.

COMPARATIVE EXAMPLE 2

For two kinds of polytetrafluoroethylene articles (Samples No. 203 and No. 204) as indicated below which are commercially available for use as a sealant, such as a gasket, the draw ratio, orientation release stress, specific grravity and compression set were measured and the results are shown in Table 1.

Sample No. 203

Polytetrafluoroethylene sheet of 2 mm in thickness [Valflon (registered trade mark), No. 7000, specific gravity 2.1, manufactured and sold by Nippon Valqua Industry Ltd., Japan].

Sample No. 204

Polytetrafluoroethylene sheet of 2 mm in thickness containing a glass fiber as the filling material in an amount of about 20% by weight [Valflon (registered trade mark)/glass-filled, No. 7010, specific gravity 2.3, manufactured and sold by Nippon Valqua Industry Ltd., Japan].

TABLE 1

| | Sample No. | Temp. (°C.) for preheating preformed sheet | Opposing die temp. (°C.) | Filing material | Heat* treatment for free shrinkage | Draw ratio | Orientation release stress at 200° C. (Kg/cm²) | Specific gravity | Compression set (%) |
|---|---|---|---|---|---|---|---|---|---|
| Example 1 | 101 | 220 | 220 | None | Effected | 3.5 | 18 | 2.16 | 30 |
| Example 1 | 102 | 220 | 220 | " | " | 4.0 | 20 | 2.16 | 20 |
| Example 1 | 103 | 220 | 220 | " | " | 4.6 | 22 | 2.16 | 17 |
| Example 1 | 104 | 260 | 260 | " | " | 4.3 | 15 | 2.16 | 19 |
| Example 1 | 105 | 300 | 300 | " | " | 5.2 | 17 | 2.16 | 12 |
| Example 1 | 106 | 320 | 320 | " | " | 5.6 | 16 | 2.16 | 10 |
| Example 1 | 107 | 340 | 340 | " | " | 8.0 | 10 | 2.16 | 10 |
| Example 2 | 108 | 320 | 320 | glass fiber | " | 6.5 | 15 | 2.3 | 12 |
| Comparative Example 1 | 201 | 220 | 220 | None | " | 2.0 | 12 | 2.16 | 57 |
| Comparative Example 1 | 202 | 280 | 280 | " | " | 2.5 | 14 | 2.16 | 43 |
| Comparative | 203 | not oriented | | " | Not | 1 | 0 | 2.16 | 67 |

TABLE 1-continued

| | Sample No. | Temp. (°C.) for pre-heating pre-formed sheet | Opposing die temp. (°C.) | Filing material | Heat* treatment for free shrinkage | Draw ratio | Orientation release stress at 200° C. (Kg/cm²) | Specific gravity | Compression set (%) |
| --- | --- | --- | --- | --- | --- | --- | --- | --- | --- |
| Example 2 | | | | | effected | | | | |
| Comparative Example 2 | 204 | " | | glass fiber | Not effected | 1 | 0 | 2.3 | 62 |

*Free shrinkage was effected at 80° C. for 2 hours. The ratio of the minimum extension to the maximum extension for Samples No. 101 to No. 108 were in the range of from 1:1.1 to 1:1.2.

EXAMPLE 3

Four preformed polytetrafluoroethylene sheets each having a thickness of 0.5 mm [Valflon (registered trade mark) cut tape No. 7900; manufactured and sold by Nippon Valqua Industry Ltd. Japan] and two preformed polytetrafluoroethylene sheets each having a thickness of 4 mm [Valflon (registered trade mark) sheet No. 7000; manufactured and sold by Nippon Valqua Industry Ltd. Japan] were separately heated in an oven of internal air circulation type at a temperature of 350° C. for about 1 hour. The crystals of each sheet were melted to give a semitransparent sheet. The sheets were taken out of the oven, and allowed to cool until the temperature at the surfaces of the sheets became lower than the melting point of the crystals of the polymer, thereby causing the surfaces of the sheets to become opaque. This cooling was effected to facilitate the separation of each sheet article after the orientation operations. Promptly after this cooling, the sheets were piled in the order of 4 mm/0.5 mm/0.5 mm/0.5 mm/0.5 mm/4 mm sheets. The piled sheets were oriented in substantially the same manner as in Example 1 using a compression press as illustrated in FIG. 3, provided with opposing dies lubricated with the silicone oil KF 965 as mentioned hereinbefore and heated at 350° C. so as to obtain four multi-axially oriented sheet articles (Sample No. 301) each having a thickness of 0.1 mm, a draw ratio of 5.0 and a specific gravity of 2.0 together with two multi-axially oriented sheet articles each having a thickness of 0.8 mm, a draw ratio of 5.0 and a specific gravity of 2.0. The orientation release stress of Sample No. 301 at 200° C. was 15 Kg/cm². The oxygen permeability of the sample was 1700 ml/m²·day.atm. By contrast, the oxygen permeability of the non-oriented polytetrafluoroethylne sheet having a thickness of 0.1 mm [Valflon (registered trade mark) cut tape No. 7900; manufactured and sold by Nippon Valqua Industry Ltd., Japan] was 7600 ml/m²·day.atm.

EXAMPLE 4 and COMPARATIVE EXAMPLE 3

The piled sheets as indicated in Example 3 were heated between press plates for 15 min so that the temperature of the piled sheets became 200° C. Then, the piled sheets were compressed between opposing dies heated at 210° C. in substantially the same manner as in Example 1 so as to obtain four muli-axially oriented sheet articles (Sample No. 401) each having a thickness of 0.1 mm, a draw ratio of 5.0, an orientation release stress at 200° C. of 15 Kg/cm² and a specific gravity of 2.1 together with two multi-axially oriented sheet articles each having a thickness of 0.8 mm, a draw ratio of 5.0, an orientation release stress at 200° C. of 15 Kg/cm² and a specific gravity of 2.1.

Substantially the same procedures as described above were repeated except that the piled sheets were preheated to 300° C. between press plates thereby to obtain four multi-axially oriented sheet articles (Sample No. 402) each having a thickness of 0.1 mm, a draw ratio of 5.0, an orientation release stress at 200° C. of 15 Kg/cm² and a specific gravity of 2.0 together with two multi-axially oriented sheet articles each having a thickness of 0.8 mm, a draw ratio of 5.0, an orientation release stress at 200° C. of 15 Kg/cm² and a specific gravity of 2.0.

The moisture permeabilities of Samples No. 401 and No. 402, together with that of a 0.1 mm thick non-oriented polytetrafluoroethylene sheet [Valflon (registered trade mark), cut tape No. 7900; manufactured and sold by Nipopon Valqua Industry Ltd., Japan] are shown in Table 2.

TABLE 2

| | Sample No. | Temp. (°C.) for pre-heating preformed sheet | Opposing die temp. (°C.) | Draw ratio | Orientation release stress (Kg/cm²) | Specific gravity | Moisture permeability (g/m² · 24 Hr) |
| --- | --- | --- | --- | --- | --- | --- | --- |
| Example 4 | 401 | 200 | 210 | 5 | 15 | 2.1 | 0.23 |
| Example 4 | 402 | 300 | 210 | 5 | 15 | 2.0 | 0.21 |
| Comparative Example 3 | 403 | not oriented | | 1 | 0 | 2.1 | 1.18 |

REFERENTIAL EXAMPLE

The tensile strength at break and tensile elongation at break were measured of Samples Nos. 102, 106, 108, 201, 301, 401, 402 and 403, and the results are shown in Table 3. Also, the whole light transmission and haze were measured of Samples Nos. 301, 401, 402 and 403, and the results are shown in Table 3.

From Table 3, it is apparent that the shaped articles of the present invention are excellent in tensile strength at break, whole light transmission and haze as compared with those of the comparative articles.

TABLE 3

| Sample No. | Thickness of Sample (mm) | Filling material | Tensile strength at break (Kg/cm$^2$) | Tensile elongation at break (%) | Whole light transmission (%) | Haze (%) |
| --- | --- | --- | --- | --- | --- | --- |
| 102 (present invention) | 2 | None | 584 | 160 | — | — |
| 106 (present invention) | 2 | " | 630 | 122 | — | — |
| 108 (present invention) | 2 | Glass fiber | 352 | 106 | — | — |
| 203 (comparative) | 2 | None | 320 | 340 | — | — |
| 301 (present invention) | 0.1 | " | 830 | 220 | 93.1 | 10.2 |
| 401 (present invention) | 0.1 | " | 850 | 220 | 90.2 | 28.6 |
| 402 (present invention) | 0.1 | " | 860 | 200 | 91.6 | 20.0 |
| 403 (comparative) | 0.1 | " | 470 | 270 | 84.8 | 81.5 |

What is claimed is:

1. A shaped article comprising a tetrafluoroethylene polymer comprising an at least biaxially oriented tetrafluoroethylene polymer having a number average molecular weight of at least about 10$^6$, which has a draw ratio (D) of at least 3.0, a specific gravity of at least 1.8 and an orientation release stress at 200° C. of at least 5 Kg/cm$^2$.

2. The shaped article according to claim 1, wherein said draw ratio satisfies the inequality:

$$3 \leq D \leq 20.$$

3. The shaped article according to claim 2, wherein said draw ratio satisfies the inequality:

$$4 \leq D \leq 15.$$

4. The shaped article according to claim 3, wherein said draw ratio satisfies the inequality:

$$5 \leq D \leq 10.$$

5. The shaped article according to claim 1, wherein said orientation release stress is at least 7 Kg/cm$^2$.

6. The shaped article according to claim 1, wherein said specific gravity is at least 2.0.

7. The shaped article according to claim 6, wherein said specific gravity is at least 2.1.

8. The shaped article according to claim 1, wherein said at least biaxially oriented tetrafluoroethylene polymer is a multi-axially oriented tetrafluoroethylene polymer.

9. The shaped article according to claim 1, wherein said biaxially oriented tetrafluoroethylene polymer is comprised of a homopolymer of tetrafluoroethylene or a copolymer of at least 70% by mole of tetrafluoroethylene and a comonomer, said homopolymer and copolymer, respectively, having a number average molecular weight of from about 10$^6$ to about 10$^8$.

10. The shaped article according to claim 9, wherein said homopolymer and copolymer, respectively, have a number average molecular weight of from about 5×10$^6$ to about 5×10$^7$.

11. The shaped article according to claim 1, which further comprises at least one filler material selected from the group consisting of a glass fiber, a carbon fiber, graphite, carbon, molybdenum disulfide, a bronze, zirconium oxide, zirconium silicate, an aromatic polyamide fiber and an aromatic polyester fiber, said filler material being present in the article in an amount of up to 60% by weight.

12. The shaped article according to claim 1, which is in a sealant form.

13. The shaped article according to claim 1, which is in a lining material form.

14. The shaped article according to claim 1, which is in a bearing pad form.

15. The shaped article according to claim 1, which is in a sliding pad form.

16. The shaped article according to claim 1, which is a solid material containing substantially no voids.

* * * * *